United States Patent
Ornstein et al.

(10) Patent No.: US 6,383,569 B2
(45) Date of Patent: May 7, 2002

(54) COMPOSITIONS AND METHODS TO PROTECT CALCITIC AND/OR SILICEOUS MATERIALS

(75) Inventors: Ian Neal Ornstein, Tucson, AZ (US); Geoffrey Charles Christ, Groton, MA (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/782,109

(22) Filed: Feb. 13, 2001

Related U.S. Application Data

(63) Continuation-in-part of application No. 09/358,304, filed on Jul. 21, 1999, now Pat. No. 6,197,382.
(60) Provisional application No. 60/094,048, filed on Jul. 24, 1998.

(51) Int. Cl.⁷ ............................. B05D 3/02; C08L 27/12
(52) U.S. Cl. ................. 427/389.7; 427/207.1; 427/255; 427/388.4; 427/393.6; 427/421; 428/500; 526/243; 526/245; 524/544; 524/555; 524/559; 524/801; 524/804; 524/805
(58) Field of Search .......................... 427/207.1, 388.4, 427/389.7, 255, 393.6, 421; 428/500; 526/243, 245; 524/544, 550, 559, 801, 804, 805

(56) References Cited

U.S. PATENT DOCUMENTS

| | | | |
|---|---|---|---|
| 5,247,008 A | 9/1993 | Michels et al. | 524/544 |
| 5,387,640 A | 2/1995 | Michels et al. | 524/544 |
| 5,439,998 A | 8/1995 | Lina et al. | 526/243 |
| 5,674,961 A | 10/1997 | Fitzgerald | 526/273 |
| 5,753,569 A | 5/1998 | Michels et al. | 442/88 |
| 5,798,415 A | 8/1998 | Corpart et al. | 525/129 |
| 5,919,527 A | 7/1999 | Fitzgerald et al. | 427/389.7 |

FOREIGN PATENT DOCUMENTS

| | | |
|---|---|---|
| EP | 0714870 | 6/1996 |
| WO | 00/05181 | 2/2000 |

OTHER PUBLICATIONS

Patent Abstracts of Japan Publication No. 08225380 (9/96).

*Primary Examiner*—Samuel A. Acquah
(74) *Attorney, Agent, or Firm*—Kevin T. Mansfield

(57) ABSTRACT

Calcitic and/or siliceous particulate materials are provided with increased resistance to penetration by water, oil or grease damage from water, oil or grease by a process which comprises treating said materials with an aqueous composition containing:

(A) from about 0.1 to 4% by weight on a 100% solids basis of an aqueous solution or self-dispersed emulsion or dispersion of a copolymer which is a reaction product of monomers containing fluorinated groups, cationic groups and nonionic groups, optionally (B) an effective amount of a penetration assistant, and (C) water to make up 100%.

11 Claims, No Drawings

COMPOSITIONS AND METHODS TO PROTECT CALCITIC AND/OR SILICEOUS MATERIALS

This application claims the benefit under 35 U.S.C. 119(e) of U.S. Provisional Application No. 60/094,048, Filed Jul. 24, 1998.

This is a continuation-in-part of application Ser. No. 09/358,304, filed on Jul. 21, 1999. now U.S. Pat. No. 6,197,382.

The present invention relates to compositions and methods to protect calcitic and/or siliceous materials from water, oil, grease and weather damage. More particularly it relates to compositions and methods employing fluorochemical copolymer compositions to protect materials such as bricks, tiles, marble, plaster, stone, cement, concrete and masonry as well as particulate materials from such damage.

BACKGROUND OF THE INVENTION

It is known that fluorochemicals, particularly certain fluorochemical copolymers, can be used to impart water, oil or grease repellency to paper and paper products, and to textile fibers such as nylon used in carpets and upholstered furniture. It is also known that certain fluorochemical copolymers can be used in combination with other substances to improve the resistance of construction materials to water and oil damage. For example JP 9286676 A teaches to employ an aqueous emulsion of a fluororesin which is a copolymer of a fluoro-olefin, a carboxylic acid vinyl ester and unsaturated monomers having hydrophilic functional groups with a water emulsion of a silane compound which has hydrolyzable functional groups to form a water-repellent, weather-resistant coating on the surface of cured concrete.

EP-A 0 714 921 teaches two component resin compositions for water-repellent coatings for textiles and building materials which comprise a fluorinated acrylic copolymer component which also contains cationic amino groups, either in salt or quaternized form, and other functional groups, and a polyisocyanate component. On mixing the two water-based components and applying the mixture to building materials, they harden rapidly to a coating which imparts stable water- and oil-repellent, anti-graffiti properties to the treated substrates.

U.S. Pat. No. 5,753,569 teaches a two component coating treatment to render substrates selected from the group consisting of naturally occurring and synthetic textiles and their mixtures, leather, mineral substances, thermoplastic and thermosetting polymers and paper, oil-, water- and soil-repellent by applying thereto compositions containing components A and B, wherein component B is a fluorine-free poly(meth)acrylate ester and component A is fluorine-containing and comprises repeating units from a) 40 to 85% by weight of (meth)acrylates containing perfluoroalkyl groups, b) 1 to 45% by weight of one or more monomers from the group consisting of styrene, acrylonitrile, vinyl acetate, vinyl propionate and (meth)acrylate esters, c) 4 to 30% by weight of (meth)acrylate esters of polyether polyols and d) 1 to 15% by weight of ionic or ionizable monomers which either contain an amine or a carboxyl function.

EP-A 0 714 870 teaches an oleophobic and hydrophobic treatment for construction materials which comprises applying to the surface of the materials to be treated a mixture of a water soluble cationic fluorinated acrylic copolymer of the type disclosed in U.S. Pat. No. 5,493,998 and a polymeric film former, polyvinyl alcohol. The copolymers are reaction products of a perfluoroalkylethyl acrylate, a dialkylalkylaminoethyl methacrylate, vinyl acetate and optionally a fourth monomer such as butyl methacrylate. While some protection can be provided by saturating a surface with an aqueous solution of the copolymer alone, the high concentration of the water-soluble cationic fluorinated acrylic copolymer required, 20–25% , makes this approach unattractive and impractical.

A disadvantage of all of the above surface treatments for a number of applications, whether they are cross-linked resins or physical mixtures with a polymeric film former, is that they form coatings which seal the surface of the construction material. This often results in an esthetically undesirable shiny and unnatural appearance. Additionally, a coating will normally make a surface more slippery and prevent water drainage. Both of these properties would be highly undesirable in a surface treatment for horizontal surfaces such as concrete floors, sidewalks, driveways, parking lots, roadways and airport runways for example.

It was therefore and object of this invention to find a one component surface treatment for calcitic and/or siliceous architectural and construction materials which was free of crosslinking agents and fluorine-free film-forming polymers which would not impart a shiny and unnatural appearance to the surfaces, and would not impair traction on treated horizontal surfaces.

It has now been found that calcitic and/or siliceous architectural and construction materials, such as bricks, tiles, marble, stone, plaster, concrete, cement and mortar masonry as well as particulate materials, can be provided with increased resistance to damage from water, oil, grease and weather, while remaining porous and retaining a natural appearance, by treating them with a composition comprising a dilute aqueous solution or self-dispersed emulsion or dispersion of certain cationic, fluorinated copolymers, optionally in the presence of an effective amount of a penetration assistant.

DETAILED DISCLOSURE OF THE INVENTION

The present invention comprises a composition which provides calcitic and/or siliceous architectural and construction materials with increased resistance to damage from water, oil, grease and weather, which composition comprises:

(A) from about 0.1 to 4% by weight, on a 100% solids basis, of an aqueous solution or self-dispersed emulsion or dispersion of a copolymer which is a reaction product of monomers containing fluorinated groups, cationic groups and nonionic groups, (B) an effective amount of a penetration assistant, and (C) water to make up 100%.

Preferably the treating compositions comprise from about 0.2 to 2% by weight of the aqueous solution or self-dispersed emulsion or dispersion of the copolymer on a 100% solids basis, more preferably from 0.4 to 1% of the copolymer, and from about 0.01 to 1% by weight, more preferably from 0.05 to 0.7% by weight of the penetration assistant.

The treating compositions may also contain up to about 2% by weight of a water-miscible organic solvent such as acetone, dioxane, tetrahydrofuran, dimethyl formamide, N-methyl-pyrrolidone, dimethylsulfoxide, ethanol, isopropanol, methyl isobutyl ketone, ethylene glycol or propylene glycol, such solvents being commonly employed during the synthesis of the copolymers. Additionally the penetration assistant may be added as a solution in an organic solvent. Preferably however the treating compositions contain no or only low amounts of organic solvents for health, safety and ecological reasons.

The treating composition may also advantageously contain conventional additives which are compatible with the mixture of the aqueous solution or self-dispersed emulsion or dispersion of the copolymer and the penetration assistant. In particular the treating composition may contain a microbicide. Many microbicides and commercial sources thereof are listed in McCutcheon's 1994 Volume 2: Functional Materials, North American Edition, McCutcheon's Division, MC Publishing Co., Glen Rock, N.J.

Component (A) suitably contains a copolymer which is a reaction product of one or more meth(acrylate) monomers containing polyfluorinated alkyl groups, cationic nitrogen groups which are partially or fully quaternized or in the form of a salt, and nonionic groups. To obtain a satisfactory balance of hydrophobic and oleophobic properties it is preferred that the copolymer be a reaction product of from about 60–90% by weight of one or more meth(acrylate) monomers containing polyfluorinated alkyl groups, from about 10 to about 30% by weight of one or more meth (acrylate) monomers containing cationic groups which are partially or fully quaternized or in the form of a salt and from about 1 to about 10% by weight of one or more monomers containing nonionic groups.

Suitable monomers containing nonionic groups include ethylene, propylene, isobutene, chloro-3-isobutene-1, butadiene, isoprene, chloro- and dichloro-butadienes, fluoro- and difluoro-butadienes, vinylidine chloride, vinyl- or vinylidine fluoride, allyl bromide, methallyl chloride, vinyl-toluene, alpha-methylstyrene, alpha-cyanomethylstyrene, divinylbenzene, N-vinylcarbazole, methyl vinyl ketone, allyl acetate, allyl propionate, allyl isobutyrate, allyl heptanoate, cetyl vinyl ether, dodecyl vinyl ether, allyl-, methyl-, ethyl-, propyl-, isopropyl-, butyl-, isobutyl-, hexyl-, heptyl-, ethyl-2-hexyl-, cyclohexyl-, lauryl-, stearyl- or ethoxyethyl esters of acrylic, methacrylic, alpha-chloroacrylic, crotonic, maleic, fumaric, itaconic, citraconic and senecioic acid, glycol or polyalkyleneglycol diacrylates and dimethacrylates, acrylonitrile, methacrylonitrile, chloro-2-acrylonitrile, cyano-2-ethyl acrylate, methylene glutaronitrile, vinylidene cyanate, isopropyl cyanoacrylate, trisacryloyl-hexahydro-s-triazine, allyl alcohol, allyl glycolate, isobutenediol, allyloxyethanol, o-allylphenol, divinylcarbinol, glycerol-allyl ether, acrylamide, methacrylamide, maleamide and maleimide, N-(cyanoethyl)acrylamide, N-isopropyl-acrylamide, diacetone-acrylamide, N-(hydroxymethyl)-acrylamide and methacrylamide, N-(alkoxymethyl)-acrylamides and methacrylamides, glyoxal-bis-acrylamide, arpino-3-crotononitrile, monoallylamine, vinylpyridines, glycidyl acrylate or methacrylate and their chlorohydrins, allyl glycidyl ether and acrolein.

Epoxy- or chlorohydrin-containing nonionic groups are preferred with glycidyl methacrylate being especially preferred.

Said copolymers are known per se or can be prepared by the conventional free radical polymerization methods described in the references discussed above, which are incorporated by reference. Additionally, some of the copolymers of the references are commercially available.

Preferably component (A) contains a copolymer which comprises monomers copolymerized in the following percentages by weight, relative to the total weight of the copolymers:

(a) from about 60% to about 90% of at least one monomer of the formula I:

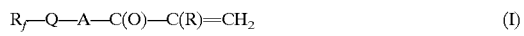
$$R_f\text{—}Q\text{—}A\text{—}C(O)\text{—}C(R)\text{=}CH_2 \quad (I)$$

wherein $R_f$ is a straight or branched-chain perfluoroalkyl group of from 2 to about 20 carbon atoms, R is H or $CH_3$, A is O, S, or N(R'), wherein R' is H or an alkyl of from 1 to 4 carbon atoms, Q is alkylene of 1 to about 15 carbon atoms, hydroxyalkylene of 3 to about 15 carbon atoms, —$(C_nH_{2n})$ $(OC_qH_{2q})_m$—, —$SO_2$—$NR'(C_nH_{2n})$—, or —$CONR'$ $(C_nH_{2n})$—, wherein R' is H or an alkyl of 1 to 4 carbon atoms, n is 1 to 15, q is 2 to 4, and m is 1 to 15;

(b) from about 10 to about 40% of at least one monomer of the formula II:

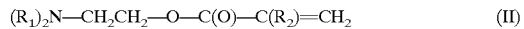
$$(R_1)_2N\text{—}CH_2CH_2\text{—}O\text{—}C(O)\text{—}C(R_2)\text{=}CH_2 \quad (II)$$

wherein $R_1$ is an alkyl group of from 1 to 3 carbon atoms, $R_2$ is H or an alkyl radical of 1 to 4 carbon atoms, and wherein the nitrogen is 40 to 100% quaternized or in the form of a salt; and (c) from about 1 to about 7% of at least one monomer of formula III or IV, or a mixture thereof:

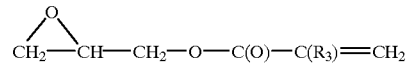

(III)

or

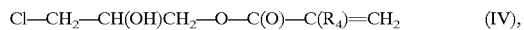
$$Cl\text{—}CH_2\text{—}CH(OH)CH_2\text{—}O\text{—}C(O)\text{—}C(R_4)\text{=}CH_2 \quad (IV),$$

wherein $R_3$ and $R_4$ are each independently H or the same or different alkyl radical of 1 to about 4 carbon atoms.

In the above compositions, preferably in formula I, $R_f$ is a straight chain perfluoroalkyl group of 2 to about 20 carbon atoms, or a mixture thereof, A is O and Q is an alkylene of 1 to about 15 carbon atoms. More preferably the monomer of formula I is a perfluoroalkylethyl acrylate having the formula $CF_3CF_2(CF_2)_xC_2H_4OC(O)\text{—}C(H)\text{=}CH_2$ wherein x is an even integer from 4 to 18, or a mixture thereof. Most preferred is a mixture having a perfluoroalkyl carbon chain length distribution (x) by weight of about 50% of 8-carbon, about 29% of 10-carbon, about 11% of 12-carbon, and with smaller percentages of 6-carbon, 14-carbon and longer chain lengths. Preferably the monomer of formula 11 is diethylaminoethyl methacrylate which has undergone partial or full salinization or quaterization and the monomer of formula III is glycidyl methacrylate.

Preferably the proportion of the monomer of formula I in the copolymer is from about 79% to about 85% by weight, the proportion of the monomer of formula II in the copolymer (in its salt form) is from about 13% to about 19% by weight and the proportion of the monomer of formula III or IV, or a mixture thereof, in the copolymer is from about 1% to about 5% by weight.

The above copolymers are known per se from U.S. Pat. No. 5,674,961, the disclosure of which is incorporated by reference, where they are taught to be useful in treating paper and paper products. Related copolymers are known per se from WO 97/39072, the disclosure of which is incorporated by reference, where they are taught to be useful in treating hard surfaces including construction materials such as brick, stone, wood, concrete, ceramics, tile, glass, stucco, gypsum drywall, particle board, or chip board.

A composition comprising an especially preferred copolymer of the type described above, but which does not contain component (B) is commercially available from the Consumer Care Division of Ciba Specialty Chemicals Corporation, High Point, N.C. as a 30% aqueous composition designated LODYNE P-514.

Component (B) is a penetration assistant. A penetration assistant is any surface-active organic substance that enhances the ability of an aqueous solution or self-dispersed emulsion or dispersion of the copolymer to penetrate and wet out a calcitic and/or siliceous substrate.

Suitable penetration assistants include both ionic and nonionic surfactants. Preferably the penetration assistant is, or contains a nonionic, cationic or amphoteric surfactant. The penetration assistant may be monomeric, oligomeric or polymeric. A large number of commercially available surfactants are described in McCutcheon's 1994 Volume 1: Emulsifiers and Detergents, North American Edition, McCutcheon's Division, MC Publishing Co., Glen Rock, N.J.

Advantageously the penetration assistant is used in liquid form, either as a neat liquid or as an aqueous or non-aqueous solution of the active substance. A particularly preferred penetration assistant is a proprietary liquid mixture known as Solvent-D, which contains propylene carbonate and which is commercially available from Polypore, Inc., Tucson, Ariz.

The amount of the penetration assistant to employ can vary widely. Generally an effective amount of the penetration assistant will reduce the surface tension of water by at least 15 percent, preferably by 20 to 60 percent. Advantageously the composition contains from about 0.01 to 1% by weight of a penetration assistant, preferably from 0.05 to 0.7% and more preferably from 0.08 to 0.15% by weight of the penetration assistant. These weight percentages are on an "as is" basis, meaning that the presence or absence of a solvent or diluent in the commercially available surface-active material is ignored.

The present invention further comprises a process which provides calcitic and/or siliceous architectural and construction materials with increased resistance to damage from water, oil, grease and weather, which process comprises treating said materials with an aqueous composition containing:

(A) from about 0.2 to 4% by weight of an aqueous solution or self-dispersed emulsion or dispersion of a copolymer which is a reaction product of monomers containing fluorinated groups, cationic groups and optionally nonionic groups, (B) an effective amount of a penetration assistant, and (C) water to make up 100%.

Preferably the process comprises treating above substrates with an aqueous composition which comprises from about 0.2 to 2% by weight of the aqueous solution or self-dispersed emulsion or dispersion of the copolymer on a 100% solids basis, and from about 0.01 to 1% by weight of the penetration assistant.

In a preferred process the copolymer in (A) is a reaction product of from about 60–90% by weight of one or more meth(acrylate) monomers containing polyfluorinated alkyl groups, from about 10 to about 40% by weight of one or more meth(acrylate) monomers containing cationic groups and from about 1 to about 10% by weight of one or more monomers containing nonionic groups. Preferably the nonionic group is selected from the group consisting of ethylene, propylene, isobutene, chloro-3-isobutene-1, butadiene, isoprene, chloro- and dichloro-butadienes, fluoro- and difluoro-butadienes, vinylidine chloride, vinyl- or vinylidine fluoride, allyl bromide, methallyl chloride, vinyl-toluene, alpha-methylstyrene, alpha-cyanomethylstyrene, divinylbenzene, N-vinylcarbazole, methyl vinyl ketone, allyl acetate, allyl propionate, allyl isobutyrate, allyl heptanoate, cetyl vinyl ether, dodecyl vinyl ether, allyl-, methyl-, ethyl-, propyl-, isopropyl-, butyl-, isobutyl-, hexyl-, heptyl-, ethyl-2-hexyl-, cyclohexyl-, lauryl-, stearyl- or ethoxyethyl esters of acrylic, methacrylic, alpha-chloroacrylic, crotonic, maleic, fumaric, itaconic, citraconic and senecioic acid, glycol or polyalkyleneglycol diacrylates and dimethacrylates, acrylonitrile, methacrylonitrile, chloro-2-acrylonitrile, cyano-2-ethyl acrylate, methylene glutaronitrile, vinylidene cyanate, isopropyl cyanoacrylate, trisacryloyl-hexahydro-s-triazine, allyl alcohol, allyl glycolate, isobutenediol, allyloxyethanol, o-allylphenol, divinylcarbinol, glycerol-allyl ether, acrylamide, methacrylamide, maleamide and maleimide, N-(cyanoethyl)acrylamide, N-isopropyl-acrylamide, diacetone-acrylamide, N-(hydroxymethyl)-acrylamide and methacrylamide, N-(alkoxymethyl)-acrylamides and methacrylamides, glyoxal-bis-acrylamide, amino-3-crotononitrile, monoallylamine, vinylpyridines, glycidyl acrylate or methacrylate and their chlorohydrins, allyl glycidyl ether and acrolein. It is especially preferred that the nonionic monomer comprises at least one monomer selected from the group consisting of glycidyl acrylate or methacrylate and their chlorohydrins.

A particularly preferred process comprises treating above substrates with an aqueous composition wherein the copolymer in (A) is a reaction product of monomers copolymerized in the following percentages by weight, relative to the total weight of the copolymers:

(a) from about 60% to about 90% of at least one monomer of the formula I:

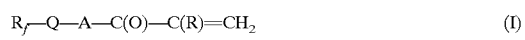

$$R_f\text{—Q—A—C(O)—C(R)}=CH_2 \tag{I}$$

wherein $R_f$ is a straight or branched-chain perfluoroalkyl group of from 2 to about 20 carbon atoms, R is H or $CH_3$, A is O, S, or N(R'), wherein R' is H or an alkyl of from 1 to 4 carbon atoms, Q is alkylene of 1 to about 15 carbon atoms, hydroxyalkylene of 3 to about 15 carbon atoms, —$(C_nH_{2n})$ $(OC_qH_{2q})_m$—, —$SO_2$—$NR'(C_nH_{2n})$—, or —$CONR'$ $(C_{n\ H2n})$—, wherein R' is H or an alkyl of 1 to 4 carbon atoms, n is 1 to 15, q is 2 to 4, and m is 1 to 15;

(b) from about 10 to about 40% of at least one monomer of the formula II:

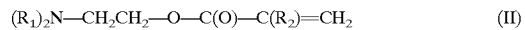

$$(R_1)_2N\text{—}CH_2CH_2\text{—O—C(O)—C}(R_2)=CH_2 \tag{II}$$

wherein $R_1$ is an alkyl group of from 1 to 3 carbon atoms, $R_2$ is H or an alkyl radical of 1 to 4 carbon atoms, and wherein the nitrogen is 40 to 100% quaternized or in the form of a salt; and (c) from about 1 to about 7% of at least one monomer of formula III or IV, or a mixture thereof:

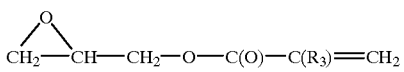

(III)

or

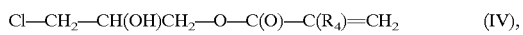

(IV), wherein $R_3$ and $R_4$ are each independently H or the same or different alkyl radical of 1 to about 4 carbon atoms.

In the above process preferably $R_f$ is a straight chain perfluoroalkyl group of 2 to about 20 carbon atoms, or a mixture thereof, A is O and Q is an alkylene of 1 to about 15 carbon atoms, the monomer of formula II is diethylaminoethyl methacrylate which has undergone partial or full salinization or quaternization and the monomer of formula III is glycidyl methacrylate.

The present invention also relates to a calcitic and/or siliceous architectural or construction material which has increased resistance to damage from water, oil, grease and weather, which material has been treated with a composition which comprises:

(A) from about 0.1 to 4% by weight, on a 100% solids basis, of an aqueous solution or self-dispersed emulsion or dispersion of a copolymer which is a reaction product of monomers containing fluorinated groups, cationic groups and nonionic groups, (B) an effective amount of a penetration assistant, and (C) water to make up 100%.

In another aspect, the present invention further comprises a process which provides calcitic and/or siliceous particulate materials such as sand, soil and crushed stone and bricks with increased resistance to penetration by water, oil or grease, which process comprises treating said materials with an aqueous composition which comprises:

(A) from about 0.2 to 4% by weight of an aqueous solution or self-dispersed emulsion or dispersion of a copolymer which is a reaction product of monomers containing fluorinated groups, cationic groups and optionally nonionic groups, optionally (B) an effective amount of a penetration assistant, and (C) water to make up 100%.

In this aspect, the process of the present invention can be used, for example, to mitigate the environmental damage due to spills in oil fields. Spills of crude oil or crude oil/water mixtures will collect in pools on soil treated according to the invention where they can be recovered, rather than sinking into the soil and polluting it. Similarly, spills in bodies of water can be contained in the water, where they are more easily recovered, if the adjacent shoreline is treated according to the process of the present invention.

Calcitic and/or siliceous particulate materials vary widely in their porosity. Some particulate materials such as sea sand are relatively small and uniform in size and shape. They pack well and the empty space between the particles, i.e. the void volume, is small. If desired they can be treated directly according to the process of the present invention. Other particulate materials such as soil and crushed stone which are less uniform in size and shape are preferably compacted to reduce the empty space between the particles prior to be treated according to the process of the present invention.

The use of a penetration assistant is optional with particulate materials due to their greater porosity as compared to more or less continuous hard surfaces. As with more or less continuous hard surfaces, the amount of the penetration assistant to employ with particulate materials can vary widely. Generally the composition contains from about 0.01 to 1% by weight of a penetration assistant, such as from 0.05 to 0.7% and in particular from 0.2 to 0.5% by weight of the penetration assistant. These weight percentages are on an "as is" basis, meaning that the presence or absence of a solvent or diluent in the commercially available surface-active material is ignored.

In treating particulate materials the preferences with regard to the fluorochemical copolymer are the same as those previously described for treating more or less continuous hard surfaces.

The compositions of the present invention are prepared by simply combining the fluorochemical copolymer and the penetration assistant, if employed, and, if desired, any conventional additives, in particular a microbicide, with water of about neutral pH with gentle agitation. Preferably the compositions are prepared by adding the fluorochemical copolymer and the penetration assistant, if employed, and any conventional additives to the water. Advantageously deionized or distilled water of about neutral pH is employed.

If desired a concentrate of the inventive composition may be prepared by combining the fluorochemical copolymer, the penetration assistant and any conventional additives and, optionally, none or preferably only a part of the water. The concentrated composition is then diluted with the appropriate amount of water to obtain a suitable concentration of the fluorochemical copolymer prior to use in the inventive treatment process.

The compositions of the present invention can be applied to the surface of a calcitic and/or siliceous architectural or construction material by any known method, for example by soaking, impregnation, immersion, brushing, rolling or spraying. Advantageously the treating compositions of the present invention are applied to the surface to be protected by spraying, and in particular by spraying with a compressed air sprayer. Suitable spraying equipment is commercially available. Spraying with a compressed air sprayer is the preferred method of application to particulate material.

The amount of the compositions of the present invention to apply to the surface of a calcitic and/or siliceous architectural or construction material is not critical. The amount should be sufficient to thoroughly wet out the surface, but excessive runoff should be avoided for ecological reasons. Naturally some very porous substrates, such as saltio tile from Mexico or particulate material, will absorb substantial amounts of the treating composition while others, like stone will take up very little. After application of the inventive composition to a substrate the treated surface should be allowed to thoroughly dry before it is exposed to water, oil or grease.

Interestingly, a porous substrate largely retains its porosity after the inventive treatment, so air and moisture vapor can still pass through. This shows that the surface is not sealed as it would be by a conventional coating. Yet liquid water, oil and grease are strongly repelled as a result of the inventive treatment. The treated substrate also retains its natural appearance.

The surface of a great variety of calcitic and/or siliceous architectural or construction materials can be successfully treated with the inventive compositions. These include concrete, paving stone, granite blocks, marble, natural stone, limestone, slate including flagstone slate, brick, porcelain, glazed and unglazed ceramic tile, saltio tile, terra-cotta, terrazzo and roofing tiles.

The surfaces to be treated may be vertical or essentially vertical, such as the exteriors of buildings, including historical buildings in need of protection from soot, acid rain and erosion, as well as statues and monuments, diagonal surfaces such as roofs of slate or tile, or they may be horizontal surfaces such as concrete floors, sidewalks and streets, and brick or flagstone walkways. Of special interest are concrete floors in automotive service stations and aircraft hangars which are routinely exposed to water, new and waste motor oil and grease as well as other fluids such as antifreeze solutions and brake and transmission fluids, and concrete roadways, especially those that are exposed to freeze-thaw cycles and treated with salts to melt snow and ice. Treatment of a concrete roadway with the compositions of the present invention can greatly mitigate freeze-thaw damage and thus decrease maintenance and extend the lifetime of the roadway in a very cost-effective manner.

The effectiveness of the surface treatment by the inventive compositions is primarily evaluated visually by applying drops of water or motor oil (Penzoil® 30weight) to a treated and dried horizontal surface. Whereas water normally wets out a calcitic and/or siliceous architectural or construction material and forms a continuous sheet or film, or is absorbed by it, depending on its porosity, water is so strongly repelled as a result of the inventive treatment that it generally simply forms small, almost hemispherical beads upon the surface of the treated material. Normally somewhat wider beads which exhibit a lower contact angle are obtained upon treatment in the absence of the wetting agent. The water may be left on the treated surface for an indefinite period of time. Eventually it simply evaporates leaving no indication of damage to the surface.

Motor oil also normally wets out and spreads across a calcitic and/or siliceous architectural or construction material and, if the surface it is porous, it slowly absorbs it. However if the surface of a calcitic and/or siliceous architectural or construction material is treated according to the inventive process there is substantially less spreading and no absorption. Hence even after an extended period the oil can be readily removed by blotting it up with an absorbent material or rinsing it off with a hose. The surface of a calcitic and/or siliceous architectural or construction material treated according to the inventive process shows improved properties relative to the same surface treated only with the copolymer.

Some of the materials treated according to the inventive process still exhibit excellent water and oil repellency after more than a year of storage.

The following non-limiting examples illustrate the preparation and use of the inventive compositions. However the invention is not limited thereto. All parts are parts by weight.

Preparation of an Inventive Composition

To a vessel containing 100 parts of deionized water is gradually added with moderate stirring 2.0 parts of LODYNE P-514, an aqueous composition comprising about 30% by weight of a cationic fluorochemical copolymer which is commercially available from the Consumer Care Division of Ciba Specialty Chemicals Corporation, High Point, N.C., followed by 0.1–0.5 parts of Solvent-D, a proprietary liquid which is available from Polypore, Inc., Tucson, Ariz. If desired a microbicide is then added and the mixture is stirred until visually homogeneous. It is stable on storage.

Application of an Inventive Composition to a Surface

Into a compressed air spraying apparatus is placed a solution having the above composition. Samples of various calcitic and/or siliceous architectural and construction materials, including concrete, paving stone, granite blocks, marble, natural stone, limestone, slate including flagstone slate, brick, porcelain, glazed and unglazed ceramic tile, saltio tile, terra-cotta, terrazzo and roofing tiles, are laid flat on a protected surface and then sprayed with the inventive composition until their surfaces are thoroughly wet out. Then the treated materials are allowed to thoroughly dry before they are evaluated as described above. Additionally, sea sand and compacted soil are sprayed with the inventive composition until their surfaces are thoroughly wet out. Concrete and cement surfaces treated according to the inventive process were evaluated and found to be slip resistant as measured by Underwriter's Laboratory's method UL 410.

What is claimed is:

1. A process which provides calcitic and/or siliceous particulate materials with increased resistance to penetration by water, oil or grease, which process comprises treating said materials with an aqueous composition containing:
   (A) from about 0.1 to 4% by weight on a 100% solids basis of an aqueous solution or self-dispersed emulsion or dispersion of a copolymer which is a reaction product of monomers containing fluorinated groups, cationic groups and nonionic groups, optionally
   (B) an effective amount of a penetration assistant, and
   (C) water to make up 100%.

2. A process according to claim 1, wherein the aqueous composition comprises from about 0.2 to 2% by weight of the aqueous solution or self-dispersed emulsion or dispersion of the copolymer on a 100% solids basis, and from about 0.01 to 1% by weight of the penetration assistant.

3. A process according to claim 1, wherein the copolymer in (A) is a reaction product of from about 60–90% by weight of one or more meth(acrylate) monomers containing polyfluorinated alkyl groups, from about 10 to about 40% by weight of one or more meth(acrylate) monomers containing cationic groups and from about 1 to about 10% by weight of one or more monomers containing nonionic groups.

4. A process according to claim 1, wherein the copolymer in (A) is a reaction product of one or more monomers containing nonionic groups selected from the group consisting of ethylene, propylene, isobutene, chloro-3-isobutene-1, butadiene, isoprene, chloro- and dichloro-butadienes, fluoro- and difluoro-butadienes, vinylidine chloride, vinyl- or vinylidine fluoride, allyl bromide, methallyl chloride, vinyl-toluene, alpha-methylstyrene, alpha-cyanomethylstyrene, divinylbenzene, N-vinylcarbazole, methyl vinyl ketone, allyl acetate, allyl propionate, allyl isobutyrate, allyl heptanoate, cetyl vinyl ether, dodecyl vinyl ether, allyl-, methyl-, ethyl-, propyl-, isopropyl-, butyl-, isobutyl-, hexyl-, heptyl-, ethyl-2-hexyl-, cyclohexyl-, lauryl-, stearyl- or ethoxyethyl esters of acrylic, methacrylic, alpha-chloroacrylic, crotonic, maleic, fumaric, itaconic, citraconic and senecioic acid, glycol or polyalkyleneglycol diacrylates and dimethacrylates, acrylonitrile, methacrylonitrile, chloro-2-acrylonitrile, cyano-2-ethyl acrylate, methylene glutaronitrile, vinylidene cyanate, isopropyl cyanoacrylate, trisacryloyl-hexahydro-s-triazine, allyl alcohol, allyl glycolate, isobutenediol, allyloxyethanol, o-allylphenol, divinylcarbinol, glycerol-allyl ether, acrylamide, methacrylamide, maleamide and maleimide, N-(cyanoethyl)acrylamide, N-isopropyl-acrylamide, diacetone-acrylamide, N-(hydroxymethyl)-acrylamide and methacrylamide, N-(alkoxymethyl)-acrylamides and methacrylamides, glyoxal-bis-acrylamide, amino-3-crotononitrile, monoallylamine, vinylpyridines, glycidyl acrylate or methacrylate and their chlorohydrins, allyl glycidyl ether and acrolein.

5. A process according to claim 4, wherein the nonionic monomer comprises at least one monomer selected from the group consisting of glycidyl acrylate or methacrylate and their chlorohydrins.

6. A process according to claim 1, wherein the copolymer in (A) is a reaction product of monomers copolymerized in the following percentages by weight, relative to the total weight of the copolymers:

(a) from about 60% to about 90% of at least one monomer of the formula I:

$$R_f\text{—}Q\text{—}A\text{—}C(O)\text{—}C(R)\text{=}CH_2 \quad (I)$$

wherein $R_f$ is a straight or branched-chain perfluoroalkyl group of from 2 to about 20 carbon atoms, R is H or $CH_3$, A is O, S, or N(R'), wherein R' is H or an alkyl of from 1 to 4 carbon atoms, Q is alkylene of 1 to about 15 carbon atoms, hydroxyalkylene of 3 to about 15 carbon atoms, —$(C_nH_{2n})(OC_qH_{2q})_m$—, —$SO_2$—NR'$(C_nH_{2n})$—, or —CONR' $(C_nH_{2n})$—, wherein R' is H or an alkyl of 1 to 4 carbon atoms, n is 1 to 15, q is 2 to 4, and m is 1 to 15;

(b) from about 10 to about 40% of at least one monomer of the formula II:

$$(R_1)_2N\text{—}CH_2CH_2\text{—}O\text{—}C(O)\text{—}C(R_2)\text{=}CH_2 \quad (II)$$

wherein $R_1$ is an alkyl group of from 1 to 3 carbon atoms, $R_2$ is H or an alkyl radical of 1 to 4 carbon atoms, and wherein the nitrogen is 40 to 100% quaternized or in the form of a salt; and (c) from about 1 to about 7% of at least one monomer of formula III or IV, or a mixture thereof:

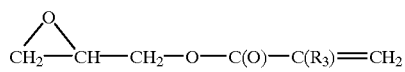

(III)

or $$Cl\text{—}CH_2\text{—}CH(OH)CH_2\text{—}O\text{—}C(O)\text{—}C(R_4)\text{=}CH_2 \quad (IV),$$

wherein $R_3$ and $R_4$ are each independently H or the same or different alkyl radical of 1 to about 4 carbon atoms.

7. A process according to claim 6, wherein $R_f$ is a straight chain perfluoroalkyl group of 2 to about 20 carbon atoms, or a mixture thereof, A is O and Q is an alkylene of 1 to about 15 carbon atoms, the monomer of formula II is diethylaminoethyl methacrylate which has undergone partial or full salinization or quaternization and the monomer of formula III is glycidyl methacrylate.

8. A process according to claim 1, wherein the calcitic and/or siliceous particulate material is sand, soil or crushed stone or bricks.

9. A process wherein the calcitic and/or siliceous particulate material is compacted prior to treatment with an aqueous composition according to claim 1.

10. A process according to claim 1, wherein the aqueous composition is sprayed onto the surface of the calcitic and/or siliceous particulate material with a compressed air sprayer.

11. A process according to claim 7, wherein the aqueous composition is sprayed onto the surface of the calcitic and/or siliceous architectural or construction material with a compressed air sprayer.

* * * * *

UNITED STATES PATENT AND TRADEMARK OFFICE
CERTIFICATE OF CORRECTION

PATENT NO.    : 6,383,569 B2
DATED         : May 7, 2002
INVENTOR(S)   : Ian Neal Ornstein et al.

It is certified that error appears in the above-identified patent and that said Letters Patent is hereby corrected as shown below:

<u>Title page,</u>
Item [73], should read:
-- Ciba Specialty Chemicals Corporation, Tarrytown, NY (US)
   Ian Neal Ornstein, Tucson, AZ (US) --.

Signed and Sealed this

Eighth Day of October, 2002

*Attest:*

*Attesting Officer*

JAMES E. ROGAN
*Director of the United States Patent and Trademark Office*